United States Patent Office 2,794,733
Patented June 4, 1957

2,794,733
METHOD FOR PREPARING CALCIUM

Peter P. Alexander, Beverly, and Robert C. Wade, Ipswich, Mass., assignors to Metal Hydrides Incorporated, Beverly, Mass., a corporation of Massachusetts No Drawing. Application May 3, 1954,
Serial No. 427,390

4 Claims. (Cl. 75—67)

This invention relates to the production of alkaline earth metals and hydrides of alkaline earth metals, such as calcium, barium and strontium, by conversion of the corresponding anhydrous chlorides or other halides. The invention contemplates the utilization of sodium metal as the principal reactant for effecting such conversion.

As disclosed in the copending application of Peter P. Alexander, Serial No. 427,389, filed May 3, 1954, calcium metal may be produced by reducing calcium chloride with sodium metal by intimately mixing while heating at a temperature between about 250° and 375° C. in an inert atmosphere and then heating the mixture at a higher temperature but below the melting temperature of the chloride mixture present during the reaction.

In our copending application Serial No. 383,910, filed October 2, 1953, now Patent No. 2,702,740, issued February 22, 1955, of which this application is a continuation-in-part, it was stated that when anhydrous calcium chloride is agitated and heated to a temperature of about 385° C. or higher but below its fusion temperature some change takes place in the excess of calcium chloride present causing it to roll up to form hard non-reactive balls. In the method described in that application a finely divided solid, which is substantially inert toward sodium metal and calcium chloride and hydrogen, is added as a "heel" to a confined reaction zone containing an atmosphere of hydrogen. A suitable solid is the reaction mixture produced by either the first or second stage of the method in the copending application of Peter P. Alexander, Serial No. 383,929, filed October 2, 1953, now Patent No. 2,702,234, issued February 15, 1955. Other suitable solids mentioned are sodium chloride and calcium hydride. Anhydrous calcium chloride and sodium metal were added in small portions to the reaction zone with continuous agitation so as to avoid accumulation of a large excess of calcium chloride and thus maintain a freely stirrable solid therein. The reaction zone was maintained at a temperature above about 385° C. but below the melting temperature of calcium chloride and the chloride mixture present during the reaction and preferably between about 420° and 600° C. A pressure of hydrogen was maintained in the reaction zone sufficient to prevent leakage of air thereinto, a pressure of about one atmosphere being suitable. When absorption of hydrogen ceased, the reaction mixture consisted essentially of calcium hydride and sodium chloride.

It has now been discovered that calcium chloride can be reduced to metal in substantially the same way by replacing the hydrogen atmosphere by an inert atmosphere to produce a reaction mixture consisting essentially of calcium metal and sodium chloride. The "heel" used may be any finely divided solid which is substantially inert toward sodium metal and calcium chloride, such as sodium chloride or a mixture of sodium chloride and calcium metal, and adapted to maintain a freely stirrable solid. Thus, a suitable solid is added as a "heel" to a confined reaction zone containing an inert atmosphere, such as vacuum or argon gas. Anhydrous calcium chloride and sodium metal are added in small portions to the reaction zone with continuous agitation. The amounts of calcium chloride and sodium metal thus added should be sufficient to react to form calcium metal and sodium chloride without accumulation of a large excess of calcium chloride in the reaction zone and thus maintain a freely stirrable solid therein. The reaction zone is maintained at a temperature above about 385° C. but below the melting temperature of calcium chloride and the chloride mixture present during the reaction and preferably between about 420° C. and 600° C. After all the sodium metal and calcium chloride have been added, the heating is continued to assure completion of the reaction such as for about one hour.

While the invention is directed particularly to the production of calcium metal, it is applicable for the production of other alkaline earth metals, such as barium and strontium, and hydrides thereof by replacing the calcium chloride by barium chloride or strontium chloride. Similarly, the chlorides of these metals may be replaced by other halides, such as the iodide, fluoride or bromide.

The invention is illustrated further by the following specific examples.

Example 1

A reaction vessel was set up with a close fitting sweep type stirrer. To this was charged 294 grams of a mixture of 25% calcium hydride and 75% sodium chloride as a "heel." The vessel was evacuated and filled with hydrogen, provision being made for maintaining a hydrogen pressure of about one atmosphere. Stirring was started and the reactor and contents heated to 420°–450° C. The bed of solids stirred easily and remained light and free flowing. Then over a period of 250 minutes a total of 184 grams of sodium metal and 448 grams of anhydrous calcium chloride were added in small increments alternately. Reaction occurred rapidly with each addition of sodium and calcium chloride. Hydrogen was added as rapidly as it was absorbed. Care was taken that no substantial excess of unreacted calcium chloride was allowed to accumulate in the reactor. This was accomplished by adding sodium metal and calcium chloride in approximately equivalent amounts with each addition. When the reaction was complete and no more hydrogen was absorbed, the product was discharged. This product analyzed 0.05% sodium hydride and 25.2% calcium hydride representing a conversion of 99.8% of theory. Recovery was 100%. A 10 gram sample was extracted with 500 ml. of anhydrous liquid ammonia at minus 28 to minus 33° C. The slurry was stirred for 15 minutes and allowed to settle for 5 minutes. The supernatant solution of sodium chloride was filtered off by an upward decantation-filtration. The product was washed a second time with 200 ml. of anhydrous liquid ammonia and filtered as previously described. 2.5 grams of calcium hydride was recovered which analyzed 84% calcium hydride. 7.25 grams of sodium chloride was recovered from the liquid ammonia extract.

Example 2

The reaction vessel used in Example 1 was used. To this was added as a "heel" 200 grams of a previously produced mixture of calcium metal and sodium chloride containing 6.5 percent unconverted calcium chloride. Then, 250 grams of calcium chloride and 69 grams of sodium metal were charged alternately over a period of 40 minutes while maintaining the reaction vessel at a temperature between 450° C. and 500° C. Then 21 grams of sodium were added to convert the excess calcium chloride in the "heel." The heating was continued for about one hour at about 550° C. The charge was stirred continuously throughout the reaction. The reactor was cooled to 100° C. and the reaction product discharged. It weighed 460.7 grams and contained 19.0 percent free calcium and 1.4 percent free sodium. The calcium conversion was 91.0 percent.

We claim:

1. The method for reducing calcium chloride which comprises introducing into a confined reaction zone containing an inert atmosphere a finely divided solid which is freely stirrable at the temperature of the reaction and which is inert toward sodium metal and calcium chloride at said temperature, adding to said reaction zone anhydrous calcium chloride and sodium metal in portions sufficiently small relative to the amount of said solid to maintain a freely stirrable solid in the reaction zone and to react to form a reaction mixture comprising essentially calcium metal and sodium chloride, continuing the addition of said portions with stirring of the charge until the desired amounts of calcium chloride and sodium metal have been added and the total amounts thereof are in the proportion of two moles of sodium metal per mole of calcium chloride, and maintaining the reaction zone at a temperature between about 385° C. and the melting temperature of the chloride mixture present during the reaction until the reaction is complete.

2. The method for reducing calcium chloride which comprises introducing into a confined reaction zone containing an inert atmosphere a finely divided solid which is freely stirrable at a temperature between about 385° C. and 600° C. and which is inert toward sodium metal and calcium chloride at said temperature, adding to said reaction zone anhydrous calcium chloride and sodium metal in portions sufficiently small relative to the amount of said solid to maintain a freely stirrable solid in the reaction zone and to react to form a reaction mixture comprising essentially calcium metal and sodium chloride, continuing the addition of said portions with stirring of the charge until the desired amounts of calcium chloride and sodium metal have been added and the total amounts thereof are in the proportion of two moles of sodium metal per mole of calcium chloride, and maintaining the reaction zone at a temperature between about 420° C. and 600° C. during said additions and until substantially all the calcium chloride and sodium metal have been converted to sodium chloride and calcium metal.

3. The method for reducing calcium chloride which comprises introducing into a confined reaction zone containing an inert atmosphere a finely divided solid which is freely stirrable at the temperature of the reaction and which is a product of the reaction of a calcium halide and sodium metal, adding to said reaction zone anhydrous calcium chloride and sodium metal in portions sufficiently small relative to the amount of said solid to maintain a freely stirrable solid in the reaction zone and to react to form a reaction mixture comprising essentially calcium metal and sodium chloride, continuing the addition of said portions with stirring of the charge until the desired amounts of calcium chloride and sodium metal have been added and the total amounts thereof are in the proportion of two moles of sodium metal per mole of calcium chloride, and maintaining the reaction zone at a temperature between about 385° C. and the melting temperature of the chloride mixture present during the reaction until the reaction is complete.

4. The method for reducing calcium chloride which comprises introducing into a confined reaction zone containing an inert atmosphere a finely divided solid which is freely stirrable at a temperature between about 385° C. and 600° C. and which is a product of the reaction of a calcium halide and sodium metal, adding to said reaction zone anhydrous calcium chloride and sodium metal in portions sufficiently small relative to the amount of said solid to maintain a freely stirrable solid in the reaction zone and to react to form a reaction mixture comprising essentially calcium metal and sodium chloride, continuing the addition of said portions with stirring of the charge until the desired amounts of calcium chloride and sodium metal have been added and the total amounts thereof are in the proportion of two moles of sodium metal per mole of calcium chloride, and maintaining the reaction zone at a temperature between about 420° C. and 600° C. during said additions and until substantially all the calcium chloride and sodium metal have ben converted to sodium chloride and calcium metal.

References Cited in the file of this patent

UNITED STATES PATENTS

| | | |
|---|---|---|
| 1,573,083 | Marden | Feb. 16, 1926 |
| 1,704,257 | Marden et al. | Mar. 5, 1928 |
| 2,029,998 | Gilbert | Feb. 4, 1936 |

FOREIGN PATENTS

| | | |
|---|---|---|
| 574,092 | Great Britain | Dec. 20, 1945 |

OTHER REFERENCES

Comprehensive Treatise on Inorganic and Theoretical Chemistry, by Mellor, vol. 3, page 718. Pub. 1923 by Longmans, Green and Co., New York.